United States Patent Office 3,311,037
Patented Mar. 28, 1967

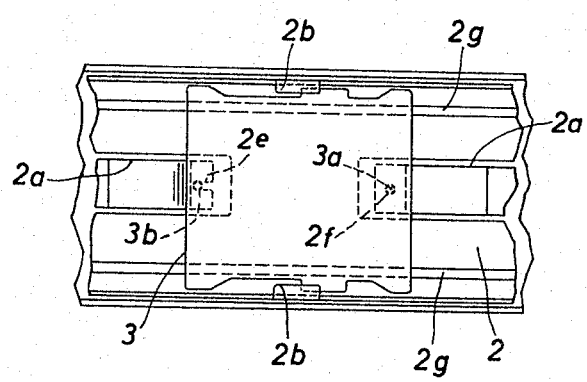
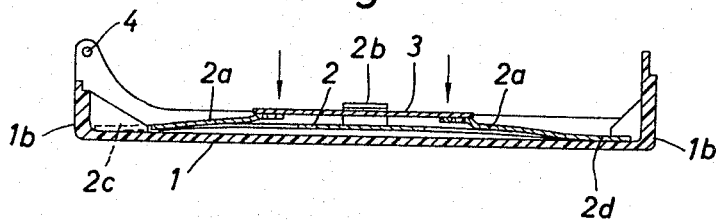

3,311,037
PRESSURE PLATE ASSEMBLY FOR CAMERAS
Alfred Winkler, Munich, Dieter Engelsmann, Unterhaching, Munich, and Siegfried Zobel, Munich, Germany, assignors to Agfa Aktiengesellschaft, Leverkusen, Germany
Filed Dec. 18, 1964, Ser. No. 419,294
Claims priority, application Germany, Dec. 20, 1963, A 21,076
10 Claims. (Cl. 95—11)

The present invention relates to cameras.

More particularly, the present invention relates to pressure plate assemblies for cameras.

As is well known, the pressure plate assembly of a camera acts on the film to maintain the latter in the focal plane as well as in slidable engagement with the guides along which the film is transported during exposure of one frame after another.

Such pressure plate assemblies are known in the widest variety of constructions.

However, the known structures suffer from a serious disadvantage, primarily because they are necessarily situated at relatively great distances from the outer periphery of the rear wall of the camera which conventionally carries the pressure plate and the spring for urging the latter toward the film. Because of the fact that the conventional structures locate the pressure plate at a considerable distance from the periphery of the rear wall of the camera, the pressure plate exerts a considerable bending moment on the rear wall of the camera, and where the camera rear wall is made of a plastic material, particularly a thin-walled plastic, deformation of the rear camera wall is frequently encountered. As a result of this deformation the light-tightness of the camera is not assured and in addition the film cannot be reliably maintained in the focal plane.

It is therefore a primary object of the present invention to provide a pressure plate assembly which will avoid the above drawbacks.

In particular, it is an object of the present invention to provide a pressure plate assembly which cannot exert on the rear wall of the camera bending moments great enough to deform the rear wall. In other words, one of the main objects of the invention is to provide a pressure plate assembly which will exert a minimum pressure on the rear wall.

In addition, it is an object of the present invention to provide an exceedingly simple and inexpensive pressure plate assembly.

Furthermore, it is an object of the present invention to provide a pressure plate assembly which will give a soft yieldability for the pressure plate while at the same time assuring proper guiding of the film.

In addition, the objects of the present invention include a structure which makes it very easy to reliably assemble the pressure plate itself with the spring structure which urges the pressure plate toward the film.

With these objects in view, the invention includes, in a camera, a rear wall having an inner surface, and an elongated leaf spring means located next to this inner surface of the rear wall and having a rear concave surface directed toward the inner surface of the rear wall, this leaf spring means having a pair of opposed ends which engage the inner surface of the rear wall and also having a pair of springy arms which tend to move away from the rear wall. A pressure plate is situated in front of and engaged by these arms so as to be urged thereby away from the rear wall of the camera.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a longitudinal, sectional plan view of a pressure plate assembly according to the invention; and FIG. 2 is a fragmentary elevation of the pressure plate assembly of the invention as seen when looking toward the pressure plate itself.

In the drawings only the rear cover 1 of the camera is illustrated, this rear cover 1 being a rear wall of the camera which is made preferably of a plastic which is relatively thin and which can be hingedly connected by suitable pivot pins 4, of which one is shown in FIG. 1, to the camera housing so as to be turnable relative thereto for opening and closing the camera housing in a well known manner, the remainder of the camera housing not being shown since it forms no part of the present invention.

This rear wall 1 of the camera is provided at its periphery with a forwardly directed endless flange 1b, so that while the rear wall 1 is made of a relatively thin-walled plastic, nevertheless because of the forwardly directed flange 1b, which is in any event required for light-tightness, the rear wall is quite strong and rigid at its periphery.

Next to the inner surface of the rear wall 1 is situated a leaf spring means 2 of the invention which forms the spring means of the pressure plate assembly, and, as is apparent particularly from FIG. 1, the elongated leaf spring means 2 extends substantially along the entire length of the rear wall 1. The leaf spring means 2 includes a pair of arms 2a which tend to move away from the rear wall 1, and these arms 2a engage the rear surface of the pressure plate 3 which is situated in front of the arms 2a, in engagement with the free ends thereof and which is urged by the arms 2a forwardly away from the rear wall 1. As is apparent particularly from FIG. 1, the leaf spring means 2 has a rear concave surface which is directed toward the inner surface of the rear wall 1.

In addition, as is apparent from FIGS. 1 and 2, the leaf spring means 2 includes upper and lower lugs 2b which are integral with the remainder of the leaf spring means and which are, for example, struck from the material of the leaf spring means, these lugs 2b each having an angular configuration and terminating in front portions which engage the front surface of the pressure plate 3 when the rear wall 1 is in a position opening the camera housing, so that these lugs 2b extend around opposed edges of the pressure plate 3 to engage the latter for limiting the movement of the pressure plate 3 away from the rear wall 1. Of course, when the rear wall 1 is in its position closing the camera housing, the pressure plate 3, by engaging the film, is pushed rearwardly away from the front portions of the lugs 2b, and of course these lugs 2b are situated beyond the film gate so that they do not participate in any way in the guiding or positioning of the film.

The concavely curved leaf spring means 2 has a pair of opposed ends 2c and 2d which are respectively situated adjacent opposed edges of the rear camera wall 1, and in the illustrated example the end 2d is fixed in any suitable way to the rear wall 1 while the end 2c slidably engages the rear wall 1, and thus the leaf spring means 2 is capable of yielding while the end 2c thereof slides along the inner surface of the rear wall 1 of the camera.

In addition to the lugs 2b it is preferred also to make the springy arms 2a integral with the remainder of the leaf spring means as by providing arms 2a which are struck from the material of the leaf spring means, so that the ends 2c and 2d, the springy arms 2a, and the holding lugs 2b are all in the form of a single, one-piece structure with the remainder of the leaf spring means 2.

A further feature of the present invention resides in the manner in which the pressure plate 3 is connected with the leaf spring means 2. With the structure of the invention it is easy to mount and dismount the pressure plate 3 on the leaf spring means 2. For this purpose the pressure plate 3 has a pair of rearwardly directed pins 3a and 3b which are fixed in any suitable way to the rear surface of the pressure plate 3, and the right arm 2a of FIGS. 1 and 2 is formed with an opening 2f which receives the pin 3a, while the left arm 2a of FIGS. 1 and 2 is formed with an elongated slot 2e which receives the pin 3b. Thus, with this construction it is an extremely simple matter to mount and dismount the pressure plate 3, so that one pressure plate 3 can be exchanged for another pressure plate whenever desired.

In order to increase the stiffness of the leaf spring means 2, it may be desirable to provide the leaf spring means 2 with longitudinally extending stiffening ribs 2g.

Inasmuch as the ends 2c and 2d of the leaf spring means are situated adjacent to opposed edges of the camera rear wall 1, the pressure exerted on the pressure plate 3 by the film cannot produce any appreciable bending moment on the rear wall 1, so that this rear wall 1 will not be deformed by the structure of the invention even if the rear wall 1 is made of a thin-walled plastic material.

Moreover, because the entire leaf spring means 2, including its ends 2c and 2d, its arms 2a, and its holding lugs 2b is made of one-piece and is assembled very simply together with the pressure plate 3, the structure of the invention is quite simple and inexpensive. The springy force acting on the pressure plate 3 with the structure of the invention is quite soft and thus will provide a faultless positioning of the film in the focal plane while at the same time providing a guiding of the movement of the film in a manner which will protect the film to a maximum extent.

It will be understood that each of the elements described above, or two or more together, may also find a useful application in other types of cameras differing from the types described above.

While the invention has been illustrated and described as embodied in pressure plate assemblies for cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera, in combination, a rear wall having an inner surface; leaf spring means located next to said inner surface of said rear wall, said leaf spring means having a concave surface directed toward said inner surface of said rear wall and having a pair of opposed ends engaging said inner surface of said rear wall, and said leaf spring means having a pair of arms spaced in the direction of film movement in said camera and tending to move away from said rear wall; and a pressure plate located in front of and adjacent to said leaf spring means so that the latter is situated between said pressure plate and said rear wall, said arms engaging said pressure plate at portions thereof spaced from each other in said direction of film movement and at a surface thereof which is directed toward said rear wall for urging said pressure plate away from said rear wall and reducing the tendency of said pressure plate to tilt relative to said direction of film movement.

2. In a camera, in combination, a rear wall having an inner surface; leaf spring means located next to said inner surface of said rear wall, said leaf spring means having a concave surface directed toward said inner surface of said rear wall and having a pair of opposed ends engaging said inner surface of said rear wall, and said leaf spring means having a pair of arms spaced in the direction of film movement in said camera and tending to move away from said rear wall, said arms being integral with the remainder of said leaf spring means and being struck from the remainder of said leaf spring means; and a pressure plate located in front of and adjacent to said leaf spring means so that the latter is situated between said pressure plate and said rear wall, said arms engaging said pressure plate at portions thereof spaced from each other in said direction of film movement and at a surface thereof which is directed toward said rear wall for urging said pressure plate away from said rear wall and reducing the tendency of said pressure plate to tilt relative to said direction of film movement.

3. In a camera, in combination, a rear wall having an inner surface; leaf spring means located next to said inner surface of said rear wall, said leaf spring means having a concave surface directed toward said inner surface of said rear wall and having a pair of opposed ends engaging said inner surface of said rear wall, and said leaf spring means having a pair of arms spaced in the direction of film movement in said camera and tending to move away from said rear wall, one of said ends of said leaf spring means being fixed to said rear wall at said inner surface thereof and the other of said ends of said leaf spring means slidably engaging said inner surface of said rear wall; and a pressure plate located in front of and adjacent to said leaf spring means so that the latter is situated between said pressure plate and said rear wall, said arms engaging said pressure plate at portions thereof spaced from each other in said direction of film movement and at a surface thereof which is directed toward said rear wall for urging said pressure plate away from said rear wall and reducing the tendency of said pressure plate to tilt relative to said direction of film movement.

4. In a camera, in combination, a rear wall having an inner surface; leaf spring means located next to said inner surface of said rear wall, said leaf spring means having a concave surface directed toward said inner surface of said rear wall and having a pair of opposed ends engaging said inner surface of said rear wall, and said leaf spring means having a pair of arms spaced in the direction of film movement in said camera and tending to move away from said rear wall, said ends of said leaf spring means being respectively situated adjacent opposed edges of said rear wall; and a pressure plate located in front of and adjacent to said leaf spring means so that the latter is situated between said pressure plate and said rear wall, said arms engaging said pressure plate at portions thereof spaced from each other in said direction of film movement and at a surface thereof which is directed toward said rear wall for urging said pressure plate away from said rear wall and reducing the tendency of said pressure plate to tilt relative to said direction of film movement.

5. In a camera, in combination, a rear wall having an inner surface; leaf spring means located next to said inner surface of said rear wall, said leaf spring means having a concave surface directed toward said inner surface of said rear wall and having a pair of opposed ends engaging said inner surface of said rear wall, and said leaf spring means having a pair of arms spaced in the direction of film movement in said camera and tending to move away from said rear wall; and a pressure plate located in front of and adjacent to said leaf spring means so that the latter is situated between said pressure plate and said rear wall, said arms engaging said pressure plate at portions thereof spaced from each other in said direction of film movement and at a surface thereof which is directed toward said rear wall for urging said pressure plate away from said rear wall and reducing the tendency of said pressure plate to tilt relative to said direction of film movement, said leaf spring means including a pair of lugs which respectively extend around opposed edges of said pressure plate and which overlap a front surface of said pressure plate which is directed forwardly away from said rear wall, said lugs limiting movement of said pressure plate away from said rear wall by said arms.

6. In a camera, a rear wall having an inner surface; leaf spring means located next to said inner surface of said rear wall, said leaf spring means having a concave surface directed toward said inner surface of said rear wall and having a pair of opposed ends engaging said inner surface of said rear wall, and said leaf spring means having a pair of arms spaced in the direction of film movement in said camera and tending to move away from said rear wall; and a pressure plate located in front of and adjacent to said leaf spring means so that the latter is situated between said pressure plate and said rear wall, said arms engaging said pressure plate at portions thereof spaced from each other in said direction of film movement and at a surface thereof which is directed toward said rear wall for urging said pressure plate away from said rear wall and reducing the tendency of said pressure plate to tilt relative to said direction of film movement, said pressure plate fixedly carrying a pair of pins which extend from said pressure plate rearwardly toward said rear wall, and one of said arms being formed with an opening which receives one of said pins while the other of said arms is formed with a slot which receives the other of said pins.

7. In a camera, in combination, a rear wall; leaf spring means engaging an inner surface of said rear wall and having a concave surface directed toward said inner surface, said leaf spring means having a pair of opposed ends respectively situated adjacent opposed edges of said rear wall and said leaf spring means having struck therefrom a pair of integral arms spaced in the direction of film movement in said camera and tending to move forwardly away from said rear wall, said leaf spring means also having a pair of lugs which have front portions spaced forwardly of the remainder of said leaf spring means; and a pressure plate situated behind said front portions of said lugs, said lugs respectively overlapping opposed edge portions of said pressure plate, and said arms of said leaf spring means engaging said pressure plate at portions thereof spaced from each other in said direction of film movement to urge said pressure plate toward said front portions of said lugs and to reduce the tendency of the pressure plate to tilt relative to said direction of film movement.

8. In a camera, in combination, a rear wall; leaf spring means engaging an inner surface of said rear wall and having a concave surface directed toward said inner surface, said leaf spring means having a pair of opposed ends respectively situated adjacent opposed edges of said rear wall and said leaf spring means having struck therefrom a pair of integral arms spaced in the direction of film movement in said camera and tending to move forwardly away from said rear wall, said leaf spring means also having a pair of lugs which have front portions spaced forwardly of the remainder of said leaf spring means, and said leaf spring means having a pair of elongated stiffening ribs extending longitudinally therealong; and a pressure plate situated behind said front portions of said lugs, said lugs respectively overlapping opposed edge portions of said pressure plate, and said arms of said leaf spring means engaging said pressure plate at portions thereof spaced from each other in said direction of film movement to urge said pressure plate toward said front portions of said lugs and to reduce the tendency of the pressure plate to tilt relative to said direction of film movement.

9. In a camera, in combination, a rear wall; leaf spring means engaging an inner surface of said rear wall and having a concave surface directed toward said inner surface, said leaf spring means having a pair of opposed ends respectively situated adjacent opposed edges of said rear wall and said leaf spring means having struck therefrom a pair of integral arms spaced in the direction of film movement in said camera and tending to move forwardly away from said rear wall, said leaf spring means also having a pair of lugs which have front portions spaced forwardly of the remainder of said leaf spring means; and a pressure plate situated behind said front portions of said lugs, said lugs respectively overlapping opposed edge portions of said pressure plate, and said arms of said leaf spring means engaging said pressure plate at portions thereof spaced from each other in said direction of film movement to urge said pressure plate toward said front portions of said lugs and to reduce the tendency of the pressure plate to tilt relative to said direction of film movement, said pressure plate having a pair of rearwardly directed pins fixed to said pressure plate and extending therefrom toward said rear wall, one of said arms being formed with an opening receiving one of said pins and the other of said arms being formed with an elongated slot receiving the other of said pins.

10. In a camera, in combination, a rear wall, said rear wall being made of a realtively thin plastic material; leaf spring means engaging an inner surface of said rear wall and having a concave surface directed toward said inner surface, said leaf spring means having a pair of opposed ends respectively situated adjacent opposed edges of said rear wall and said leaf spring means having struck therefrom a pair of integral arms spaced in the direction of film movement in said camera and tending to move forwardly away from said rear wall, said leaf spring means also having a pair of lugs which have front portions spaced forwardly of the remainder of said leaf spring means; and a pressure plate situated behind said front portions of said lugs, said lugs respectively overlapping opposed edge portions of said pressure plate, and said arms of said leaf spring means engaging said pressure plate at portions thereof spaced from each other in said direction of film movement to urge said pressure plate toward said front portions of said lugs and to reduce the tendency of the pressure plate to tilt relative to said direction of film movement.

References Cited by the Examiner

UNITED STATES PATENTS

| | | | |
|---|---|---|---|
| 2,186,633 | 1/1940 | Drotning | 95—31 |
| 3,103,861 | 9/1963 | Koeppe | 95—31 |

JOHN M. HORAN, *Primary Examiner.*